(No Model.)
L. MIDDLETON.
PLANT SPRINKLER.
No. 506,708. Patented Oct. 17, 1893.
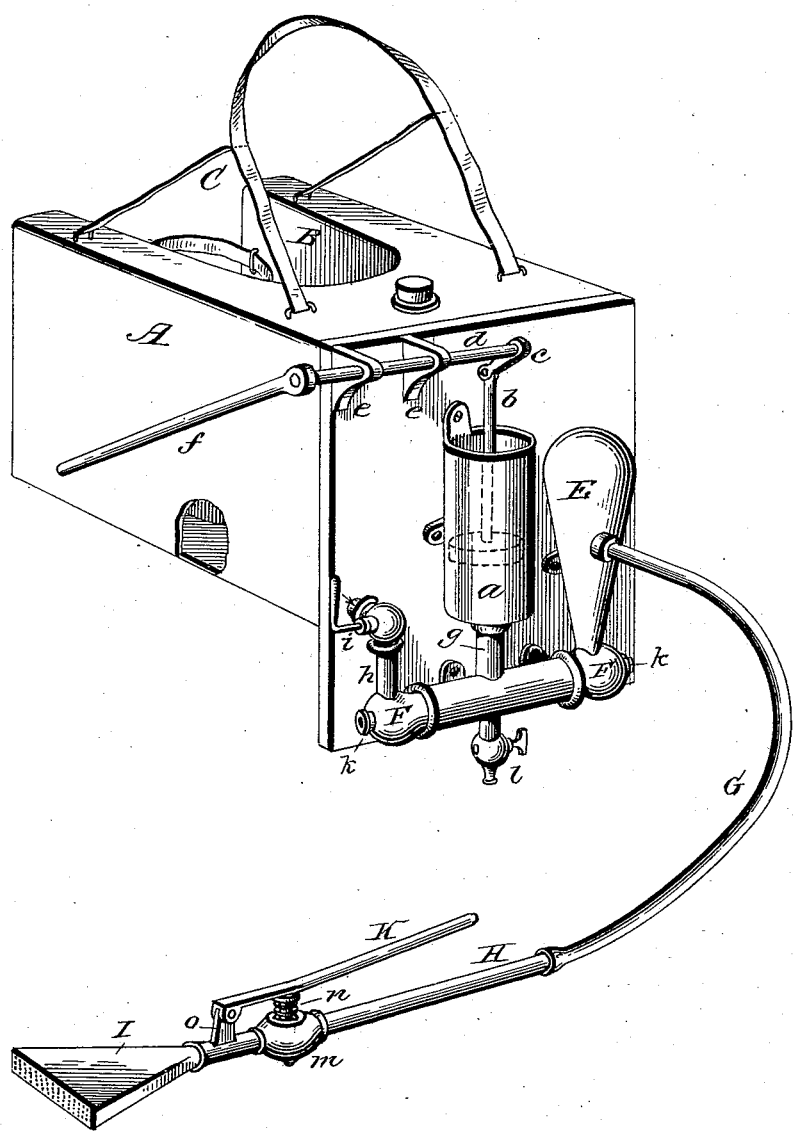
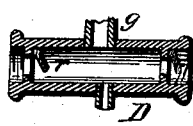
Witnesses
L. C. Hills
A. W. Manning
Inventor
Lee Middleton,
per Chas. H. Fowler
Attorney

UNITED STATES PATENT OFFICE.

LEE MIDDLETON, OF CLARKSVILLE, MISSOURI.

PLANT-SPRINKLER.

SPECIFICATION forming part of Letters Patent No. 506,708, dated October 17, 1893.

Application filed February 20, 1893. Serial No. 462,971. (No model.)

*To all whom it may concern:*

Be it known that I, LEE MIDDLETON, a citizen of the United States, residing at Clarksville, in the county of Pike and State of Missouri, have invented certain new and useful Improvements in Plant-Sprinklers; and I do hereby declare that the following is a full, clear, and exact description of the same, reference being had to the annexed drawings, making a part of this specification, and to the letters of reference marked thereon.

The present invention has relation to that class of sprinkling or spraying devices in which a poisonous fluid is used to destroy bugs or insects upon plants, and has for its object to provide a simple device of this character that will eject the fluid with the required force to thoroughly and effectively cover the plants, and a device that can be easily operated and the discharge of fluid readily controlled.

The above objects I attain by a device constructed substantially as shown in the drawings and hereinafter described and claimed.

Figure 1 of the drawings is a perspective view of my improved device showing a portion of the tank partly broken away; Fig. 2, a longitudinal section in detail of the supply cylinder.

In the accompanying drawings A represents the tank for containing the poisonous fluid, which tank may be of any desirable capacity and of sheet metal or other preferred material, and has an arch shaped opening B to adapt it to the body of the person who is to use it. The tank is provided with a suitable harness as shown at C, consisting of an arrangement of straps to pass around the body and over the shoulders to hold the tank in place.

To the outer end of the tank A is connected a small force-pump, consisting of a cylinder $a$ and piston $b$, said piston having pivoted to its upper end a crank $c$ to which is rigidly attached one end of a rod $d$, with its bearings in suitable brackets $e$, and upon the outer end of the rod is a handle $f$ for operating the piston through the medium of the rod and crank. At the bottom of the cylinder $a$ is a short pipe $g$ which communicates therewith and with a supply cylinder D disposed horizontally and having at one end an air chamber E and at the other end communicating with the tank through the medium of a short pipe connection $h$ which is provided with a shut-off faucet $i$.

It is preferred that the supply cylinder D be provided with detachable heads F connected to the ends of the cylinder by screw thread couplings or by any other well known means so that access to the interior of the cylinder may be obtained for cleaning it of any sediment that may accumulate therein. The heads F may each be provided with a removable plug $k$ so that access can be had to the interior for the purpose of cleaning, the cylinder D having also a drain cock $l$.

When the device is not in use or after using, the shut-off faucet $i$ is closed and the drain cock $l$ opened, and by working the pump any of the poisonous liquid remaining in the cylinders and pipes may be forced out either through the drain-cock or the sprinkling head hereinafter described.

To the air chamber E is connected one end of a rubber or other flexible tube G, and to the opposite end of the tube is attached the pipe H provided at its outer end with a flat flaring sprinkling head I. The pipe H has an enlargement as shown at $m$ which is provided with a spring actuated valve $n$, operated to close the opening in the pipe by being pressed down by the hand-lever K. The hand-lever has one end pivoted to an upwardly projecting lug $o$ on the pipe, and when the lever is compressed, the valve against which the lever comes in contact will force down the valve and close or partially close the opening in the pipe. It will therefore be seen that the supply of liquid to the sprinkling head is controlled by the spring actuating valve and the hand lever which operates it, thereby allowing a greater or less flow of liquid to the sprinkling head and consequently increasing or diminishing its force.

The supply cylinder D has valves $r$ $s$ at its ends with suitable seats therefor which alternately open and close on the upward and downward stroke of the piston.

The tank A is supplied with the fluid through an opening which is closed by a suitable plug $u$.

Having now fully described my invention, what I claim as new, and desire to secure by Letters Patent, is—

1. In a plant sprinkler, a suitable tank and a liquid forcing apparatus connected thereto upon the outside of said tank and consisting of a pump, a supply cylinder provided with valves and communicating with the pump, removable heads upon the ends of the cylinder and provided respectively with a pipe and shut-off faucet for the supply of liquid to the pump, and an air chamber, and a drain cock connecting with the supply cylinder, substantially as and for the purpose set forth.

2. A plant sprinkler, consisting of a suitable tank having an arched shape opening to adapt it to the body of the user and a harness for securing it thereto, and a liquid forcing apparatus connected to the tank upon the outside thereof and consisting of a suitable pump, a supply cylinder communicating therewith, detachable heads upon the ends of the cylinder, a pipe with faucet forming a communication between the tank and cylinder and an air chamber upon the respective heads, and a suitable spraying device connecting with the air chamber, substantially as and for the purpose described.

In testimony that I claim the above I have hereunto subscribed my name in the presence of two witnesses.

LEE MIDDLETON.

Witnesses:
J. L. CARROLL,
T. S. McQUEEN.